United States Patent [19]

Wittenstein

[11] 4,158,761
[45] Jun. 19, 1979

[54] PLURAL WORK-PIECE POSITIONING APPARATUS

[75] Inventor: Horst Wittenstein, Ennepetal, Fed. Rep. of Germany

[73] Assignee: Carl Dan. Peddinghaus KG, Ennepetal, Fed. Rep. of Germany

[21] Appl. No.: 806,603

[22] Filed: Jun. 15, 1977

[30] Foreign Application Priority Data

Jun. 22, 1976 [DE] Fed. Rep. of Germany ....... 2627838

[51] Int. Cl.² ............................................... B23P 1/04
[52] U.S. Cl. ................................ 219/69 R; 219/69 E; 219/69 G
[58] Field of Search ................ 219/69 R, 69 M, 69 G, 219/69 V, 69 W, 69 E, 158, 159, 161; 269/310; 74/110; 204/129.5

[56] References Cited

U.S. PATENT DOCUMENTS

| 3,231,430 | 1/1966 | Kriegeu et al. | 219/69 R |
| 3,739,135 | 6/1973 | Pfau et al. | 219/696 |

*Primary Examiner*—Bruce A. Reynolds
*Attorney, Agent, or Firm*—H. Dale Palmatier

[57] ABSTRACT

A workpiece support for supporting multiple workpieces in an immersion bath for spark machining including a stationary workpiece support and an adjustable workpiece support in side by side relation, an electrode holder overlying the supports and carrying a pair of electrodes thereon, the adjustable workpiece support having a pair of cylindrical rollers rotatable on axes eccentric of the cylindrical outer face, a coverplate with openings receiving the outer surfaces of the rollers therethrough, a closed chamber containing gear wheels connected to the rollers for simultaneously turning the eccentric rollers about their rotation axes, and a manual operating apparatus for turning the gear wheel.

1 Claim, 3 Drawing Figures

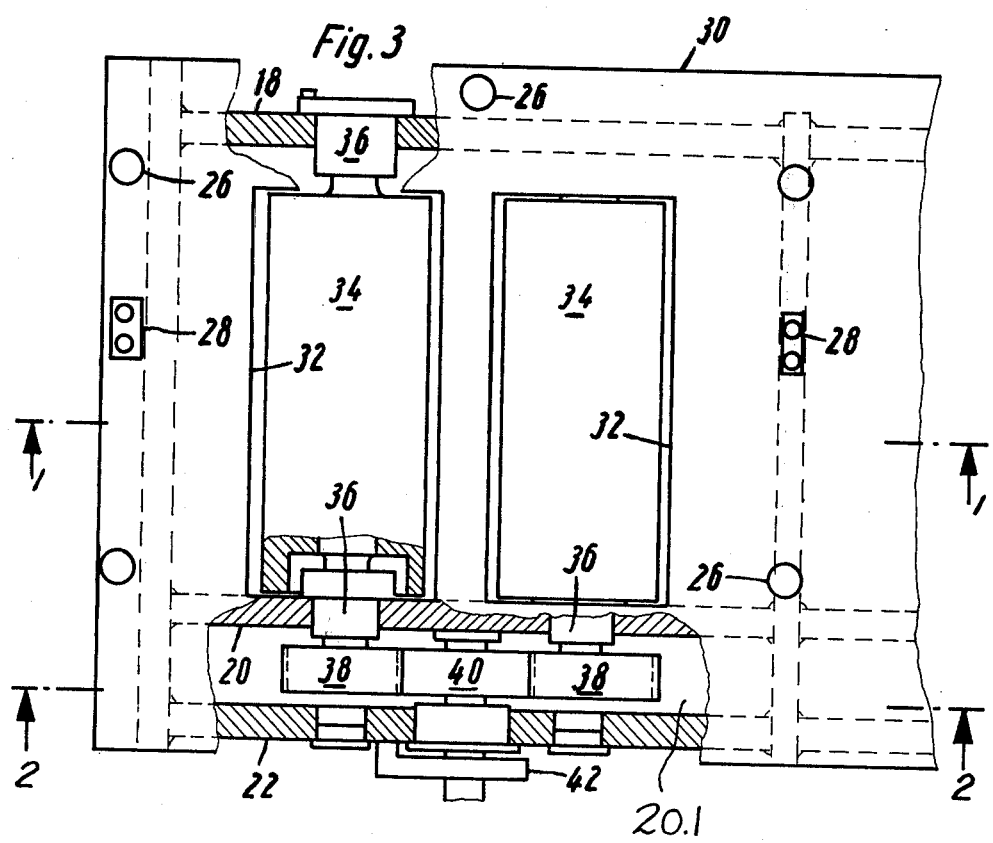

PLURAL WORK-PIECE POSITIONING APPARATUS

This invention relates to work-piece positioning apparatus.

In spark-machining (also known as spark-erosion) apparatus it is usual to clamp a work-piece, for example a block of metal to be spark-machined into a die, on a support surface with an electrode suspended above the workpiece in an electrode guide mounting. During spark-machining, at least the working space between the work-piece and the electrode is filled with an insulating liquid. As spark-machining proceeds, the electrode is slowly lowered until the required depth of machining is achieved.

Modern spark-machining apparatus is often of a multi-electrode design, that is to say a plurality of work-pieces can be spark-machined simultaneously by means of a corresponding plurality of electrodes, there being a separate electrical supply, such as a separate pulsed current source, for each electrode. Such apparatus is advantageous for machining work-pieces which are to form associated parts (for example, upper and lower dies for use in forging) since machining of both or all, work-pieces to the same depth is accomplished by the plurality of electrodes being commonly mounted.

The achievable accuracy of machining depends on the accuracy with which the electrodes are made and the accuracy of positioning of the work-pieces in the plane to which the electrode feed direction is a normal. It is known to use stops in the positioning of the work-pieces. Vertical adjustment, that is depth adjustment, is determined prior to spark-machining by lowering the electrodes onto the blank work-pieces and during spark-machining by an adjustable feed mechanism.

This prior vertical adjustment is difficult to achieve when there are several work-pieces and several commonly mounted electrodes since the adjustment which is correct for one work-piece is not usually correct for the other or others. Compensation for the difference in vertical spacing can be made using shims in mounting either the electrodes or the work-pieces but this is troublesome, time-consuming and adversely affects accuracy of alignment of the electrodes and work-pieces. As a result, multi-electrode spark-machining has been used to only a limited extent in spite of its inherent advantages.

The ordinary mechanisms used, for example, in machine tools for raising and lowering work-beds are not suitable for use in spark-machining. This is because the work-piece in spark-machining is submerged in liquid insulating material in which the removed metal particles float. These particles would soon find their way into the parts of ordinary adjusting mechanisms and cause them to become jammed and unusable.

It is known to provide an adjustment on the electrode holders, German Utility Model No. 1,858,078 disclosing an arrangement like a pair of pincers for this purpose, usable for a simple rod electrode. In the case of an electrode for forming a complicated die needing to be adjusted, this pincer-like arrangement would be just as unsuitable as the method of using shims since a precisely co-planar adjustment must be achieved.

It is an object of the invention to provide an improved work-piece positioning apparatus.

The present invention provides a work-piece positioning apparatus for use when machining in an immersion bath, the apparatus comprising:

at least rotatably mounted rollers with their outer surfaces arranged to act as abutments for a work-piece to be machined, the radial distance between the axis of rotation of each roller and its surface progressively increasing in a circumferential directional over at least a part of the surface to provide a positional adjustment of said work-piece on rotation of the rollers, a coupling mechanism linking the two rollers for rotation in synchronism, and a chamber housing the coupling mechanism and being arranged to prevent immersion liquid from reaching the coupling mechanism during use.

By way of example only, a work-piece positioning apparatus embodying the invention will now be described with reference to the accompanying drawing, in which:

FIG. 1 is a diagrammatic view in vertical section of the work-piece positioning apparatus, FIG. 2 is another diagrammatic view in vertical section of the work-piece positioning apparatus, and FIG. 3 is a diagrammatic plan view, partly cut-away, of the work-piece positioning apparatus and shows the lines I—I and II—II on which the sections of FIGS. 1 and 2 are respectively taken.

Referring to the drawings, the illustrated work-piece positioning apparatus is intended for use in a two-electrode spark-machining apparatus. The positioning apparatus is generally box-like, having an upper part on which two work-pieces are placed and an open bottom part. Preferably, the apparatus is constructed using a number of welded steel plates. FIG. 1 illustrates part of the spark-machining apparatus, reference 10 illustrating two electrodes and reference 12 two uniform insulating plates. The electrodes 10 are clamped to a common electrode holder with a respective insulating plate 12 interposed between each electrode and the electrode holder 10.1.

That part of the work-piece positioning apparatus lying beneath the left-hand electrode 10 in FIG. 1 incorporates a height adjustment mechanism but, the work positioning apparatus 30.1 lying beneath the right-hand electrode does not. The right-hand part is not therefore shown in full in the drawing since it is essentially of a mere box-like construction.

The apparatus has vertical walls 14, 16, 18, 20 and 22 and two further walls, parallel to walls 14 and 16, in the non-illustrated right-hand part. Welded to these further walls and to the wall 14 are horizontally-projecting portions 24 to enable the apparatus to be clamped to a supporting surface (not shown).

The top of the apparatus carries in predetermined positions stops 26 in the form of cylindrical bolts and workpiece abutments 28 for holding (in a known manner) the work-pieces.

A cover plate 30 is welded to the tops of the walls and in the left-hand part of the apparatus has two parallel rectangular openings 32 therein. A respective cylindrical roller 34 of circular cross-section projects from beneath through each opening 32, the axes of the rollers being parallel to each other and to the plane of the cover plate 32. Each roller 34 is eccentrically mounted on a respective shaft. When the shafts are turned so that the rollers 34 project as little as possible the top surface of the cover plates defines tangents to the circular cross-sections of the rollers (this is the position illustrated in FIG. 1). The two rollers are substantially identical in size and mounting.

Referring to FIG. 3, the walls 20 and 22 define a chamber 20.1 in which actuating mechanism for the rollers 34 is located. Within this chamber, a respective gearwheel 38 is mounted on the shaft of each roller, the shafts being mounted by bearings 36. The two gear wheels 38 are substantially identical and both mesh with a common driving gearwheel 40.

The gearwheel 40 is keyed onto a shaft which extends through the wall 22 and which has, at its outer free end, an actuating and indexing means 42 which is shown only diagrammatically since it can be of any desired form. The shaft of the driving gear wheel 40 is mounted in a fluid-tight manner by the walls 20 and 22. The bearings 36 in the wall 20 are likewise fluid-tight.

When the driving gearwheel 40 is turned by use of the means 42, the rollers 34 are caused to rotate in the same direction and thus project further through the openings 32. Because of their eccentric mountings, the rollers 34 project to a progressively increasing extent as they are rotated through up to 180° from the position shown in FIG. 1. The uppermost surfaces of the rollers 34 act against the back of the left-hand work-piece (not illustrated) and lift it as the degree of projection increases. The amount of eccentricity in the roller mountings is small so that a very fine height adjustment is achieved and the adjustment does not have to be locked.

When spark-machining is in progress, the support surface with the work-piece positioning apparatus secured thereto is in a bath of insulating liquid. During the spark-machining operation, the liquid is circulated and filtered since the removed particles of metal float about in it. The liquid is stopped from reaching the gearwheels 38 and 40 by their being within the chamber 20.1 defined by the walls 20 and 22, parts of the walls 14 and 16, and the cover plate 30. The junctions between these stated parts defining the chamber are fluid-tight and the occluded air within the chamber prevents the ingress of insulating liquid from beneath the chamber. By this means, metal particles in the insulating liquid are kept away from the gear wheels 38 and 40 and this is important as otherwise the particles would settle on the gear wheels and render them unusable in a short time by interfering with the proper meshing of the gear teeth. Notwithstanding this feature of preventing the ingress of the insulating liquid the contents of the chamber are easily accessible when the work-piece positioning apparatus is removed from the support surface.

Means can be provided to enable the electrode holder to be aligned with the work-piece positioning apparatus before the latter is clamped on the support surface. This allows the main part of the setting-up operation to be carried out away from the remainder of the spark-machining apparatus. The electrode holder and the work-piece positioning apparatus are fitted to the remainder of the spark-machining apparatus just before the commencement of spark-machining. Final height adjustment, however, needs to be carried out after the electrode holder and workpiece-positioning apparatus are fitted to the remainder of the spark-machining apparatus and for that reason the illustrated apparatus is advantageous in providing an accurate adjustment but nevertheless being simple in design and easy to operate.

To summarise, what has been described is for use in clamping at least two electrodes and at least two work-pieces on a spark-machining apparatus, to the spindle sleeve of which the electrodes, operated on a multi-channel basis, are secured for lowering over a machine bench to which the work-pieces are clamped, wherein positioning apparatus for supporting the work-pieces is clamped on the machine bench, which positioning apparatus has a means for the controlled lifting of at least one work-piece accurately parallel to the direction in which the spindle sleeve is lowered, the lifting means comprising two cylindrical rollers, the surfaces of the walls of which project through cut-away portions in a cover plate for the positioning apparatus, and the axes of which, extending transversely to the lifting direction, are off-centre from the bearings of the rollers relative to which bearings the rollers can be rotated in synchronism, the positioning apparatus being formed as a box which is open at the bottom and has an inner vertical partition in which sealed bearings for the rollers are located, and driving means for rotating the rollers in synchronism being housed within a space which is bounded by the partition and which is sealed except at its lower opening.

If more than two channels and therefore more than two electrodes and work-pieces are used, the number of lifting devices is correspondingly increased, that is to two when three channels are used, to three when four channels are used and so on.

It will be noted that each roller carries a gearwheel which is aligned with the bearings, two similar gearwheels mesh with the driving gearwheel which is manually operable, and the two gearwheels and the driving gearwheel are housed in a space proof against the entry of liquid. This is a preferred drive arrangement for the rollers.

The electrodes, secured to the spindle sleeve, are arranged at more or less the same level with the aid of shims of insulating material but this insulation for the individual electrodes requires to be levelled no more than approximately on the bench side since any differences in the thickness of the insulating shims can be offset at the same time by means of the lifting device.

The method of using the described apparatus is to align the blank work-pieces horizontally, each workpiece having its top surface lying in a respective plane. The work-piece which is aligned on the lifting device is chosen as the one which gives the greater work-piece to electrode spacing. The electrode holder is then indexed to zero in relation to the other work-piece, and the first work-piece is then raised until it too is at zero level, it being unnecessary to alter its horizontal alignment.

What we claim is:

1. Apparatus for positioning a plurality of workpieces for spark machining thereof in an immersion bath, the apparatus comprising a stationary support for one of the workpieces and an adjustable support for another workpiece, the two workpiece supports being disposed in side by side relation, an electrode holder and a pair of electrodes overlying, respectively, the stationary and adjustable workpiece supports, the adjustable workpiece support including at least two rotatably mounted rollers with their outer surfaces arranged to act as abutments for a workpiece to be machined, the radial distance between the axis of rotation of each roller and its surface progressively increasing in a circumferential direction over at least a part of the surface to provide a positional adjustment of said workpiece on rotation of the rollers, the rollers having substantially cylindrical surfaces eccentrically related to the axis of rotation thereof, and frame means defining a chamber confining the rollers therein and a coverplate overlying said chamber and having openings therein receiving the outer surfaces of the rollers, wall means adjacent one end of each of the adjoining rollers and defining a gear wheel chamber sealed from said first mentioned chamber and free of the immersion bath, gear wheels in said gear wheel chamber and connected with the rollers for turning the rollers and raising and lowering the outer surfaces thereof relative to the coverplate and to the stationary workpiece support, whereby to facilitate simultaneous spark machining of multiple workpieces in accurate relation to each other.

* * * * *